US012625453B2

(12) United States Patent
Shimodaira et al.

(10) Patent No.: US 12,625,453 B2
(45) Date of Patent: May 12, 2026

(54) TRANSPORT UNIT AND IMAGE FORMING APPARATUS

(71) Applicant: FUJIFILM Business Innovation Corp., Tokyo (JP)

(72) Inventors: Yoshiki Shimodaira, Kanagawa (JP); Hideki Kuge, Kanagawa (JP); Takayuki Ukawa, Kanagawa (JP); Masato Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 330 days.

(21) Appl. No.: 18/326,189

(22) Filed: May 31, 2023

(65) Prior Publication Data

US 2024/0168426 A1 May 23, 2024

(30) Foreign Application Priority Data

Nov. 17, 2022 (JP) ................................ 2022-184285

(51) Int. Cl.
*B65H 29/58* (2006.01)
*B65H 5/02* (2006.01)
*G03G 15/00* (2006.01)

(52) U.S. Cl.
CPC ......... *G03G 15/6529* (2013.01); *B65H 5/021* (2013.01); *B65H 2406/32* (2013.01)

(58) Field of Classification Search
CPC .... B65H 29/24; B65H 29/241; B65H 29/242; B65H 29/58; B65H 29/60; B65H 2301/44336; B65H 2301/44735; B65H 2406/30; B65H 2406/32; B65H 2406/36
USPC ........................................ 271/184, 225, 303
See application file for complete search history.

(56) References Cited

U.S. PATENT DOCUMENTS 3,861,259 A * 1/1975 Hitch .................... B65H 29/68 271/197
5,732,609 A * 3/1998 Marschke ............. B65H 29/60 83/167
8,544,842 B2 * 10/2013 Schulze-Hagenest ...................... B65H 29/242 271/302
9,128,438 B2 * 9/2015 Atay ................. H04N 1/00665

FOREIGN PATENT DOCUMENTS

JP 2006-003404 A 1/2006
JP 2006-176265 A 7/2006
JP 2010-096822 A 4/2010

* cited by examiner

*Primary Examiner* — Leslie A Nicholson, III
(74) *Attorney, Agent, or Firm* — Sughrue Mion, PLLC

(57) ABSTRACT

A transport unit includes a transport device including a loop member that turns and that has no ends, the transport device transporting a recording medium with the recording medium attracted to a surface of the loop member; a guide unit that changes a transport direction of the recording medium fed from the transport device and that guides the recording medium in one of multiple transport directions; and a controller that controls the transport device, based on the transport direction that is changed by the guide unit such that attraction force of the transport device is changed.

11 Claims, 19 Drawing Sheets

TRANSPORT UNIT AND IMAGE FORMING APPARATUS

CROSS-REFERENCE TO RELATED APPLICATIONS

This application is based on and claims priority under 35 USC 119 from Japanese Patent Application No. 2022-184285 filed Nov. 17, 2022.

BACKGROUND

(i) Technical Field

The present disclosure relates to a transport unit and an image forming apparatus.

(ii) Related Art

In Japanese Unexamined Patent Application Publication No. 2010-96822, an image forming apparatus includes a fixing unit that heats paper on a transport belt in a contactless manner by using a heat source. The transport belt inclines in a transport direction at a predetermined angle at which the paper slides down. A distance from a transfer portion upstream of the fixing unit to the heat source of the fixing unit and a distance from the heat source of the fixing unit to a discharge roller downstream of the fixing unit are greater than a maximum paper size. A fan attracts the paper to the transport belt by using air attraction force. When the paper that is transported abnormally stops, the rotation of the fan stops, the air attraction force is lost, and consequently, the paper moves to a position upstream or downstream of the heat source while sliding down on the transport belt.

SUMMARY

An existing transport unit includes a transport device that transports a recording medium with the recording medium attracted to a loop member that turns and that has no ends and a guide unit that guides the recording medium that is fed from the transport device in one of multiple transport directions.

In some cases, the recording medium that is fed by the transport device is curved by the guide unit, and a direction in which the recording medium is transported is consequently changed. When the recording medium is thus curved, the recording medium is separated from the loop member if the attraction force of the transport device is weak.

Aspects of non-limiting embodiments of the present disclosure relate to the case where a recording medium that is fed from a transport device is guided in one of multiple transport directions, and a transport failure is inhibited from occurring, unlike the case where force for attracting a recording medium to a loop member is always constant.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a transport unit including a transport device including a loop member that turns and that has no ends, the transport device transporting a recording medium with the recording medium attracted to a surface of the loop member; a guide unit that changes a transport direction of the recording medium fed from the transport device and that guides the recording medium in one of multiple transport directions; and a controller that controls the transport device, based on the transport direction that is changed by the guide unit such that attraction force of the transport device is changed.

BRIEF DESCRIPTION OF THE DRAWINGS

Exemplary embodiments of the present disclosure will be described in detail based on the following figures, wherein.

DETAILED DESCRIPTION

First Exemplary Embodiment

A transport unit and an image forming apparatus according to a first exemplary embodiment of the present disclosure will be described by way of example with reference to FIG. 1 to FIG. 18. In the figures, an arrow H represents an up-down direction of the apparatus (a vertical direction), an arrow W represents a width direction of the apparatus (a horizontal direction), and an arrow D represents a depth direction of the apparatus (a horizontal direction).

Image Forming Apparatus 10

Figure 1:
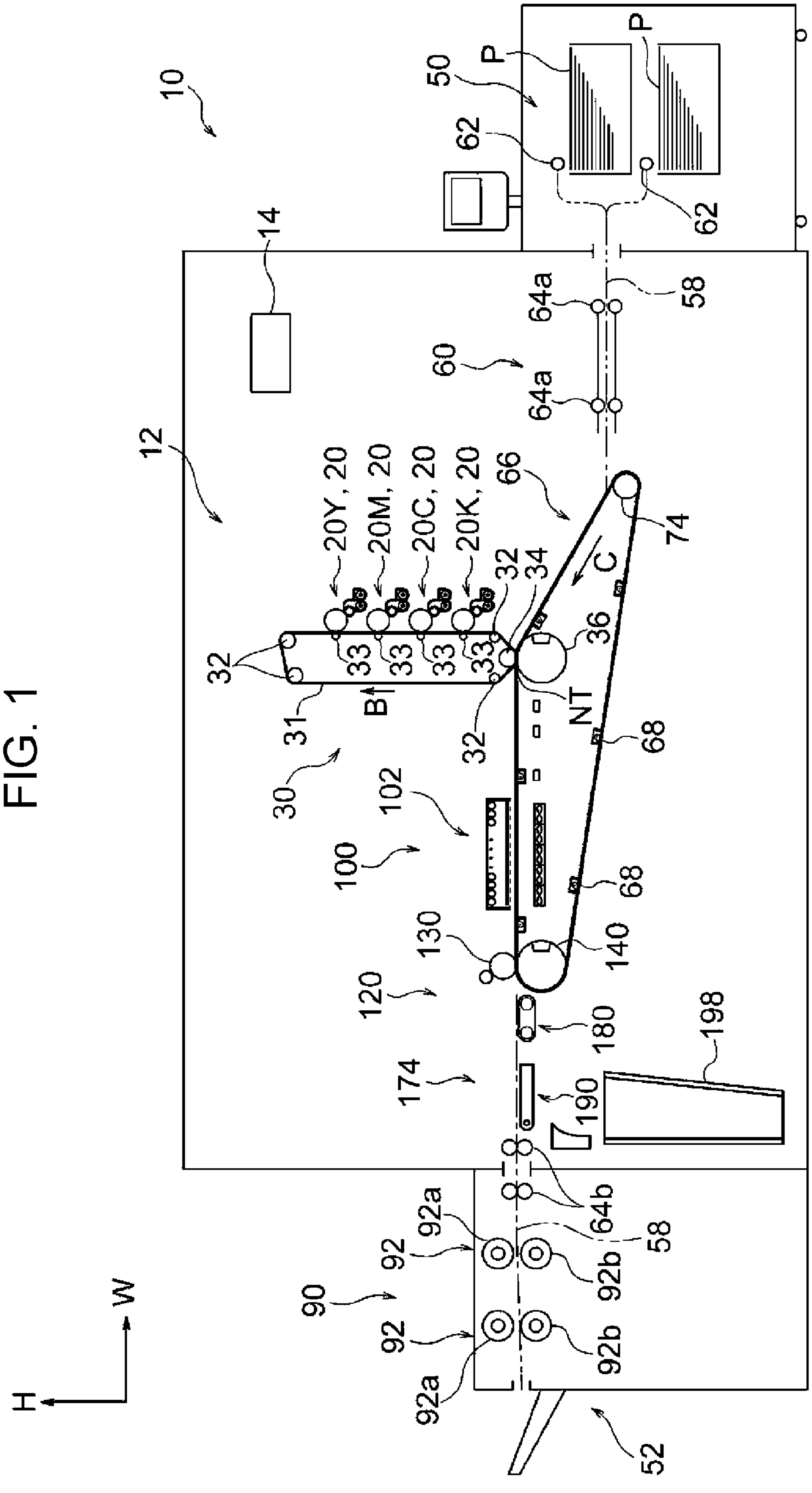
FIG. 1 illustrates the overall configuration of an image forming apparatus according to a first exemplary embodiment of the present disclosure.

An image forming apparatus 10 according to the present exemplary embodiment is an electrophotographic image forming apparatus that forms toner images on a sheet P corresponding to a recording medium. As illustrated in FIG. 1, the image forming apparatus 10 includes container units 50, a discharge portion 52, an image forming unit 12, a transport mechanism 60, a fixing device 100, a cooling portion 90, and a controller 14 that controls components.

Container Units 50

The container units 50 are disposed at a side portion of the image forming apparatus 10 in the width direction and are arranged in the up-down direction, and the number thereof is two. The container units 50 contain the sheets P. Each sheet P is selectively fed from the two container units 50.

Discharge Portion 52

The discharge portion 52 is disposed at another side portion of the image forming apparatus 10 in the width direction, and the sheet P on which the toner images are formed is discharged onto the discharge portion 52. Specifically, the toner images are fixed by the fixing device 100, and the sheet P is subsequently cooled by the cooling portion 90 and is discharged onto the discharge portion 52.

Image Forming Unit 12

The image forming unit 12 includes toner image forming units 20 that are disposed between the container units 50 and the discharge portion 52 in the width direction and that form the toner images and a transfer device 30 that transfers the toner images that are formed by the toner image forming units 20 to the sheet P.

The multiple toner image forming units 20 form the toner images in colors. The image forming apparatus 10 includes the toner image forming units 20 for four colors of yellow (Y), magenta (M), cyan (C), and black (K) in total. Symbols of (Y), (M), (C), and (K) illustrated in FIG. 1 represent components for the respective colors described above. In the following description, Y, M, C, and K are omitted in some cases where Y, M, C, and K are not particularly distinguished.

Toner Image Forming Units 20

Figure 2:
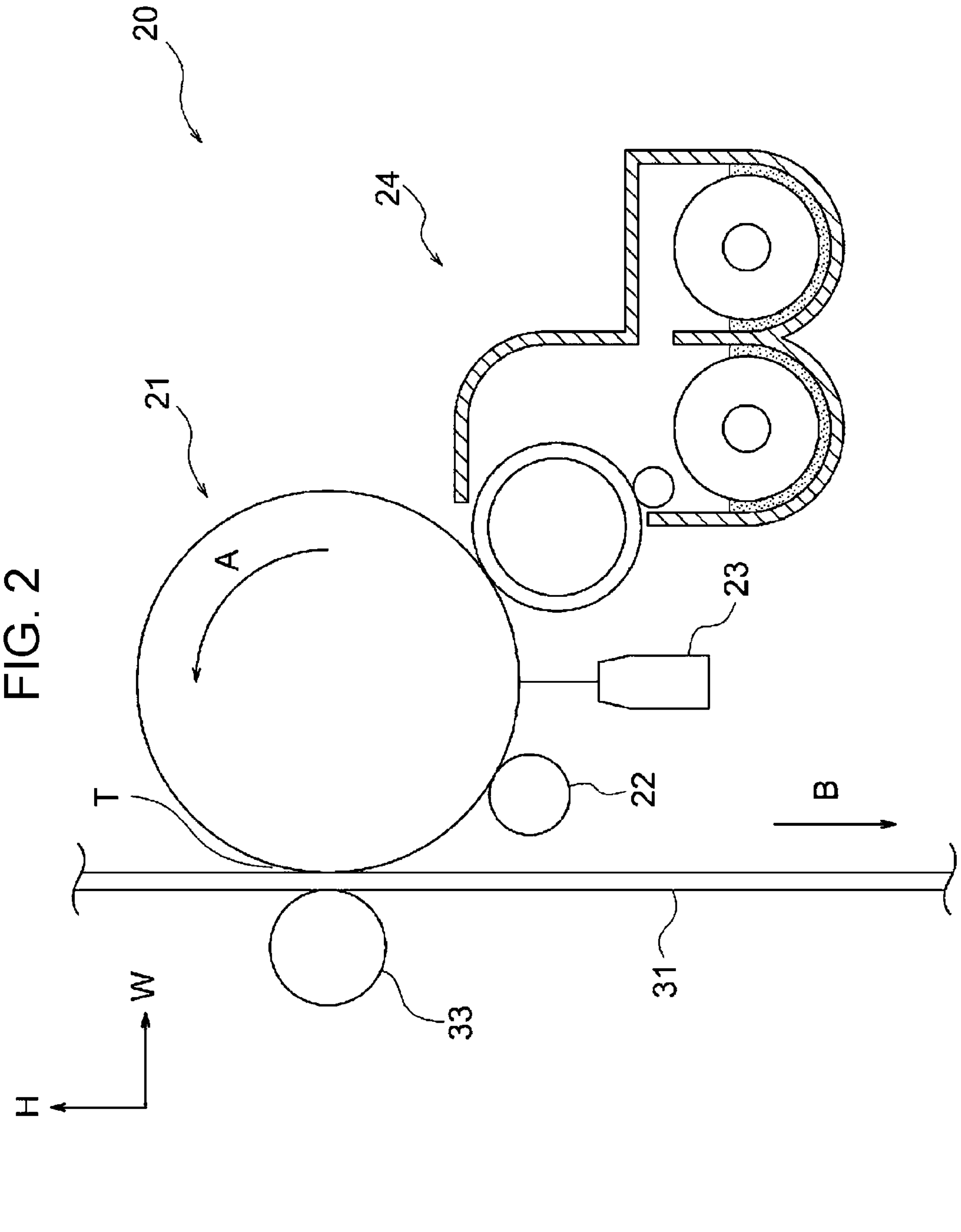
FIG. 2 illustrates a toner image forming unit that is included in the image forming apparatus according to the first exemplary embodiment of the present disclosure.

The toner image forming units 20 for the respective colors basically have the same structure except for toner to be used. Specifically, as illustrated in FIG. 2, the toner image forming units 20 for the respective colors include photoconductor drums 21 that rotate in the direction of an arrow A in the figure and chargers 22 that charge the photoconductor drums 21. The toner image forming units 20 for the respective colors also include exposure devices 23 that expose the photoconductor drums 21 charged by the chargers 22 to light and that form electrostatic latent images on the photoconductor drums 21 and developing devices 24 that use the toner to develop the electrostatic latent images that are formed on the photoconductor drums 21 by using the exposure devices 23.

Transfer Device 30

As illustrated in FIG. 1, the transfer device 30 includes a transfer belt 31 that serves as an intermediate transfer body, first transfer rollers 33, a second transfer roller 34, and a facing roller 36.

The first transfer rollers 33 transfer the toner images that are formed on the photoconductor drums 21 to the transfer belt 31 at first transfer positions T (see FIG. 2) between the photoconductor drums 21 and the first transfer rollers 33.

The transfer belt 31 has no ends and is wound around multiple rollers 32 so as to have predetermined posture. At least one of the multiple rollers 32 is rotated, and the transfer belt 31 consequently turns in the direction of an arrow B and transports a first-transferred image to a second transfer position NT.

A part of the transfer belt 31 is wound around the second transfer roller 34. The facing roller 36 faces the second transfer roller 34 with the transfer belt 31 interposed therebetween.

Consequently, the second transfer roller 34 rotates along with the transfer belt 31 that turns, and the toner images on the transfer belt 31 are transferred to the sheet P that is transported and that passes through the second transfer position NT with the sheet P interposed between the facing roller 36 and the transfer belt 31 that rotate. The facing roller 36 is an example of a rotation member. The second transfer roller 34 is an example of a transfer member.

Transport Mechanism 60

As illustrated in FIG. 1, the transport mechanism 60 includes feed rollers 62 that feed each sheet P that is contained in the container units 50 to a path 58 for transporting the sheet P, multiple transport rollers 64*a* that transport the sheet P that is fed to the path 58 for transporting, a chain gripper 66, a transport unit 174, and multiple transport rollers 64*b*.

The multiple transport rollers 64*a* transport the sheet P that is fed from the feed rollers 62 to the chain gripper 66. The transport unit 174 receives the sheet P from the chain gripper 66. The multiple transport rollers 64*b* receive the sheet P from the transport unit 174 and transport the sheet P to the cooling portion 90 (see FIG. 4). The transport unit 174 will be described in detail later.

Figure 3:
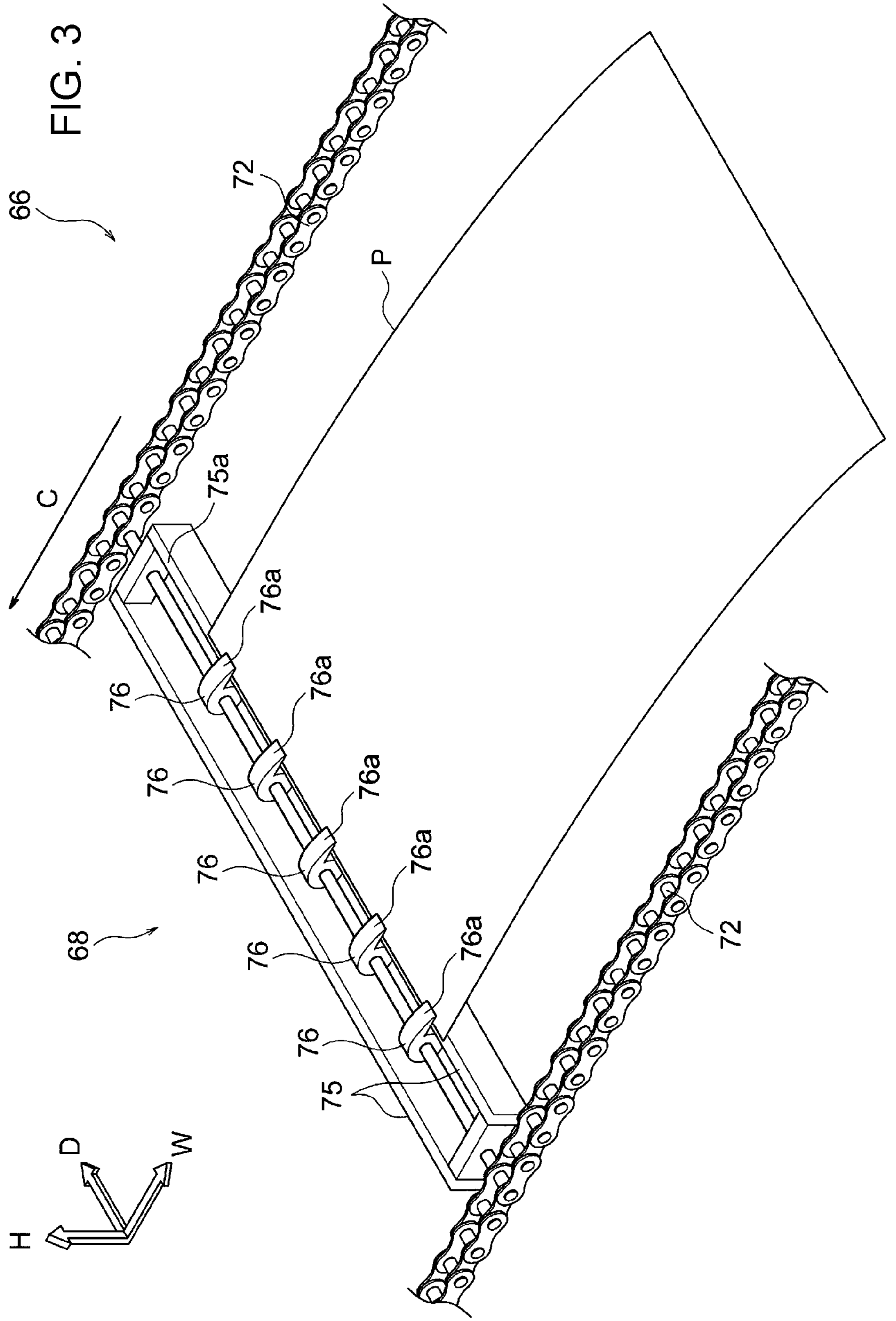
FIG. 3 is a perspective view of a chain gripper that is included in the image forming apparatus according to the first exemplary embodiment of the present disclosure.

As illustrated in FIG. 3, the chain gripper 66 includes two chains 72 and holding members 68 that hold a leading edge portion of the sheet P.

Fixing Device 100

Figure 5:
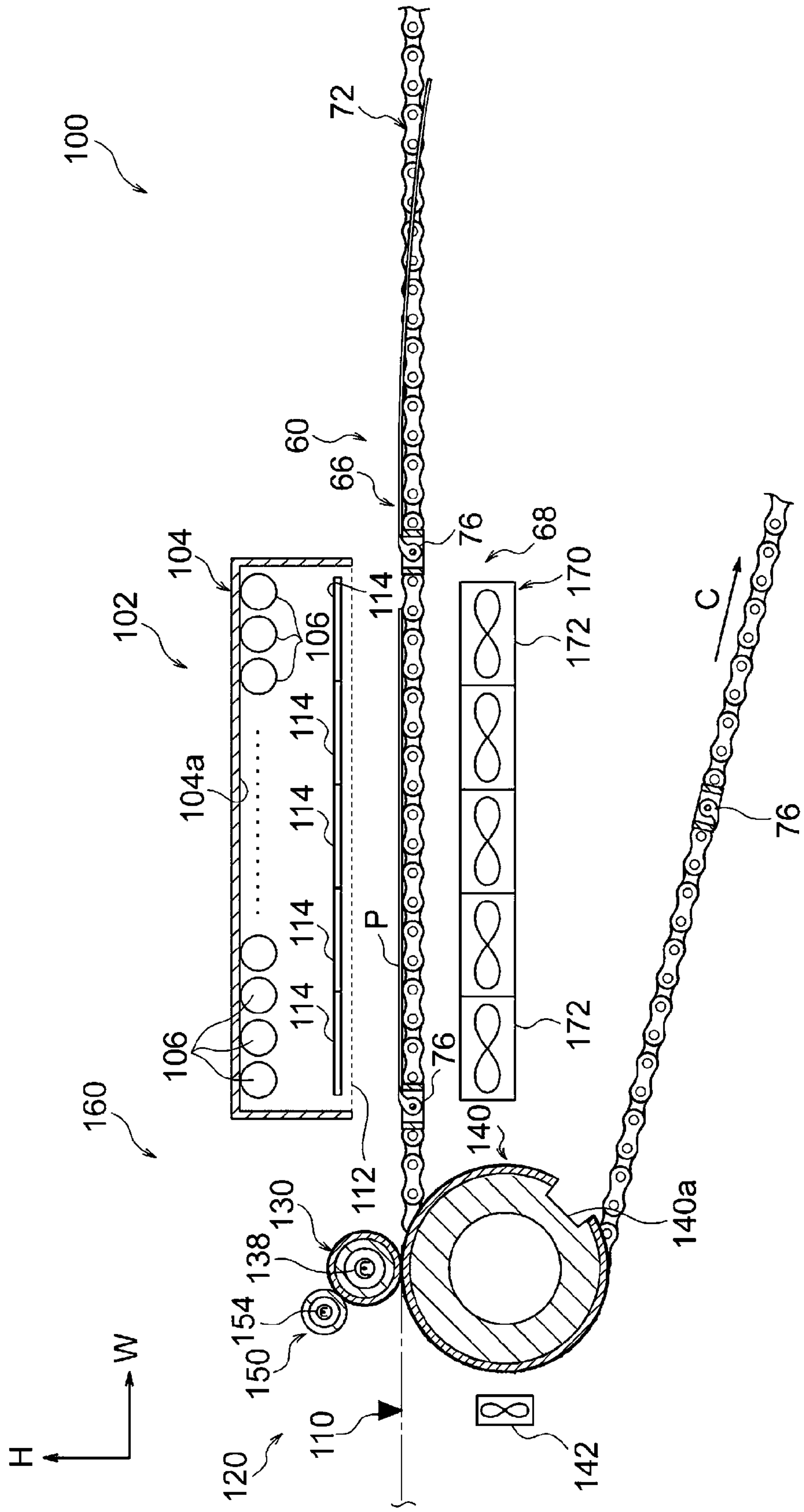
FIG. 5 is a front view of, for example, a fixing device that is included in the image forming apparatus according to the first exemplary embodiment of the present disclosure.

As illustrated in FIG. 5, the fixing device 100 includes the chain gripper 66 and a pre-heat member 102 that is disposed downstream of the transfer device 30 (see FIG. 1) in a direction in which the sheet P is transported and that heats the transported sheet P in a contactless manner. The fixing device 100 also includes a heat member 120 that comes into contact with the sheet P and that heats and presses the sheet P and a blower unit 170. A heating unit 160 includes the pre-heat member 102 and the heat member 120 and heats the sheet P.

Chain Gripper 66

As illustrated in FIG. 3, the chain gripper 66 includes the two chains 72 and the holding members 68 that hold the sheet P.

Chains 72

As illustrated in FIG. 3, the two chains 72 are separated from each other in the depth direction of the apparatus. The two chains 72 are disposed at an end and another end of the facing roller 36 (see FIG. 1) in an axial direction and are wound around two sprockets (not illustrated) the axial direction of which coincides with the depth direction of the apparatus, two sprockets 71 (see FIG. 7) that are disposed at an end and another end of a pressure roller 140 described later in an axial direction, and two sprockets 74 (see FIG. 1) that are arranged at an interval in the depth direction of the apparatus. Any one of the sprockets rotates, and consequently, the chains 72 turn in the direction of an arrow C.

Both end portions of each holding member 68 that holds the sheet P are mounted on the two chains 72.

Holding Members 68

As illustrated in FIG. 3, the holding members 68 have the end portions that are mounted on the two chains 72 and include mount members 75 that extend in the depth direction of the apparatus and grippers 76 that are mounted on the mount members 75. The multiple holding members 68 are arranged in a predetermined interval in a circumferential direction of the chains 72 (a turn direction).

The multiple grippers 76 are mounted on the mount members 75 at a predetermined interval in the depth direction of the apparatus. Specifically, each gripper 76 includes a pawl 76*a*. Each mount member 75 includes a contact portion 75*a* with which the pawl 76*a* comes into contact. The gripper 76 grips the leading edge portion of the sheet P by interposing the leading edge portion of the sheet P between the pawl 76*a* and the contact portion 75*a*. As for the gripper 76, for example, the pawl 76*a* is pressed against the contact portion 75*a* by using, for example, a spring, and the pawl 76*a* comes into contact or is separated from the contact portion 75*a* by using, for example, a cam action.

With this structure, the chains 72 turn in the direction of the arrow C, the chain gripper 66 illustrated in FIG. 1 consequently receives the sheet P that is transported by the transport rollers 64*a*, and the sheet P is transported to the second transfer position NT with the leading edge of the sheet P gripped. The chain gripper 66 transports the sheet P to the heat member 120 after passing through the pre-heat member 102.

Heat Member 120

As illustrated in FIG. 5, the heat member 120 is disposed downstream of the pre-heat member 102 in the direction in which the sheet P is transported. The heat member 120 includes a heat roller 130 that heats the sheet P with the heat roller 130 being in contact with the sheet P that is transported, the pressure roller 140 that presses the sheet P toward the heat roller 130, and a driven roller 150 that rotates in conjunction with the heat roller 130 that rotates.

Heat Roller 130

As illustrated in FIG. 5, the heat roller 130 comes into contact with an upward facing surface of the sheet P that is transported and extends in the depth direction of the apparatus, and the axial direction thereof coincides with the depth direction of the apparatus. The heat roller 130 contains a heater 138.

Figure 7:
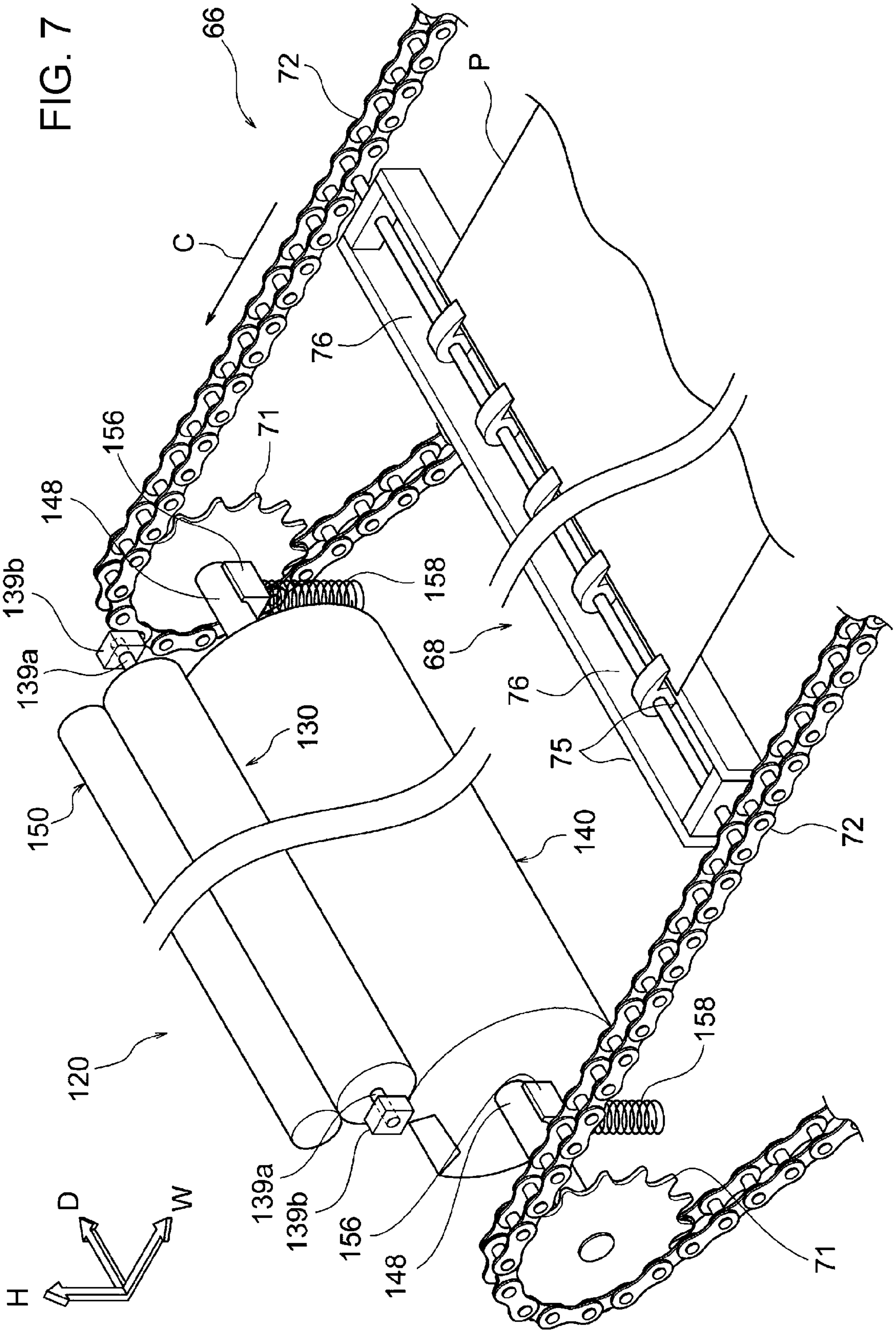
FIG. 7 is a perspective view of a heat member that is included in the image forming apparatus according to the first exemplary embodiment of the present disclosure.

As illustrated in FIG. 7, shaft members 139*a* extend in the depth direction of the apparatus at both end portions of the heat roller 130 in the depth direction of the apparatus. Support members 139*b* that support the respective shaft members 139*a* are provided. Consequently, the heat roller 130 is rotatably supported by the support members 139*b* at both end portions of the heat roller 130.

Driven Roller 150

As illustrated in FIG. 5 and FIG. 7, the driven roller 150 extends in the depth direction of the apparatus opposite the sheet P that is transported with the heat roller 130 interposed therebetween, and the axial direction thereof coincides with the depth direction of the apparatus. The driven roller 150 contains a heater 154.

With this structure, the driven roller 150 rotates in conjunction with the heat roller 130. The driven roller 150 heats the heat roller 130.

Pressure Roller 140

As illustrated in FIG. 7, the pressure roller 140 comes into contact with a downward facing surface of the sheet P that is transported opposite the heat roller 130 with the sheet P that is transported interposed therebetween and extends in the depth direction of the apparatus, and the axial direction thereof coincides with the depth direction of the apparatus. The pressure roller 140 includes two shaft members 148 that are formed at both end portions in the depth direction of the apparatus. The outer diameter of the pressure roller 140 is larger than the outer diameter of the heat roller.

Figure 8:
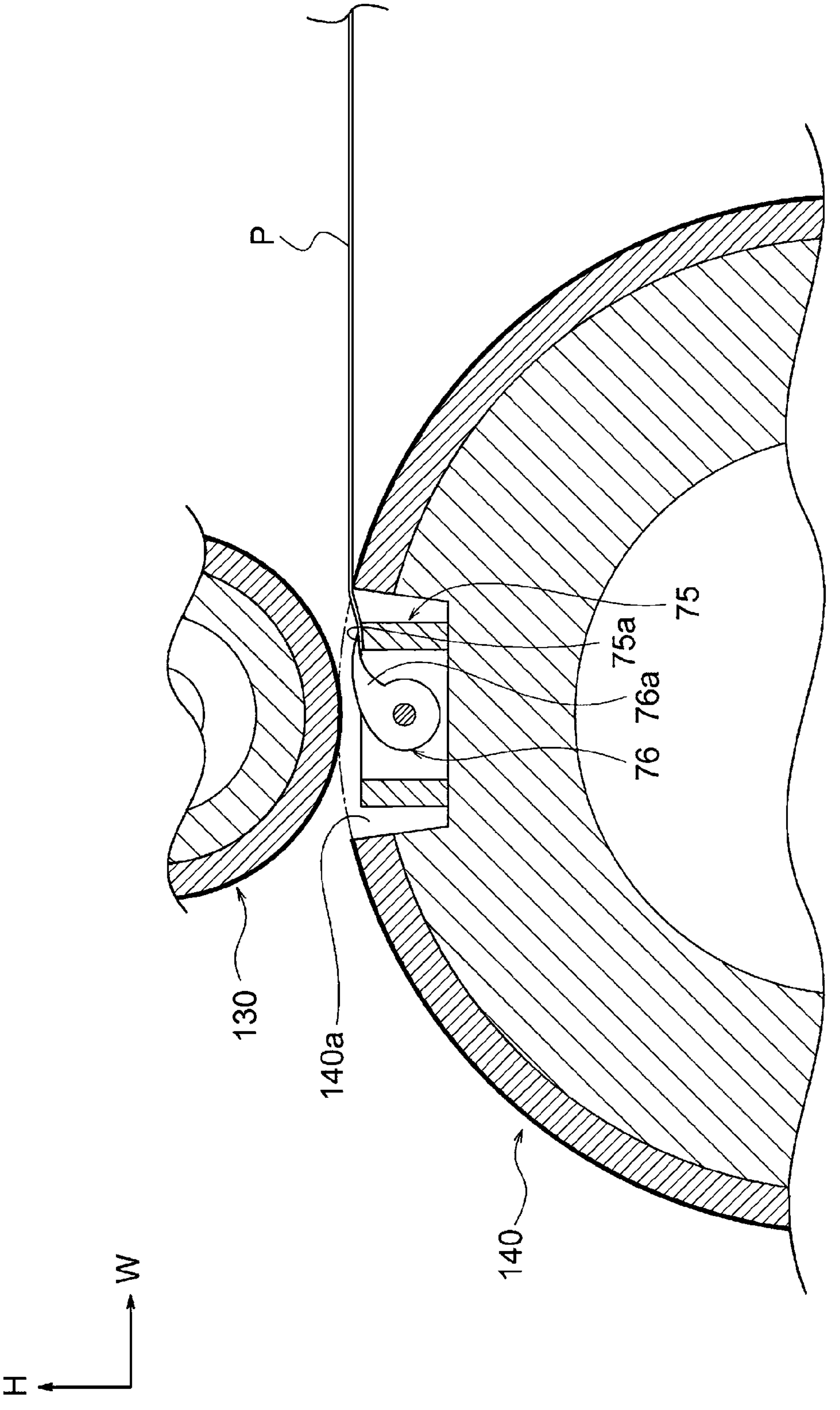
FIG. 8 is a sectional view of the heat member that is included in the image forming apparatus according to the first exemplary embodiment of the present disclosure.

As illustrated in FIG. 8, a recessed portion 140*a* that extends in the depth direction of the apparatus is formed on an outer circumferential surface of the pressure roller 140. In the case where the sheet P passes between the pressure roller 140 and the heat roller 130, the grippers 76 that grip the leading edge portion of the sheet P are contained in the recessed portion 140*a*.

Others

As illustrated in FIG. 7, the heat member 120 includes support members 156 that support the pressure roller 140 and urging members 158 that urge the pressure roller 140 toward the heat roller 130 with the support members 156 interposed therebetween. The support members 156 are paired. The paired support members 156 are disposed so as to be capable of rotatably supporting the two shaft members 148 of the pressure roller 140 from below.

As illustrated in FIG. 5, a sensor 110 that is an optical sensor that detects the sheet P that is transported is disposed downstream of a contact portion between the heat roller 130 and the pressure roller 140 in the direction in which the sheet P is transported.

A fan 142 faces the pressure roller 140 and cools the holding members 68 after the sheet P is given to the transport unit 174 (see FIG. 1).

With this structure, the two urging members 158 urge the pressure roller 140 toward the heat roller 130, and the pressure roller 140 consequently presses the sheet P toward the heat roller 130. A drive member, not illustrated, transmits rotational force to the pressure roller 140, and the pressure roller 140 consequently rotates. The heat roller 130 rotates in conjunction with the pressure roller 140 that rotates. The driven roller 150 rotates in conjunction with the heat roller 130 that rotates. The heat roller 130 and the pressure roller 140 transport the sheet P to which the toner images are transferred with the sheet P interposed therebetween, and the toner images are consequently fixed to the sheet P. The heat roller 130 and the pressure roller 140 thus transport the sheet P while rotating with the sheet P interposed therebetween, the sheet P is heated, and the toner image are consequently fixed to the sheet P.

Pre-Heat Member 102

As illustrated in FIG. 5, the pre-heat member 102 is disposed downstream of the second transfer position NT (see FIG. 1) at which the toner images are transferred to the sheet P and upstream of the heat member 120 in the direction in which the sheet P is transported. The pre-heat member 102 is disposed above the sheet P that is transported. In other words, the pre-heat member 102 faces the surface of the sheet P that is transported to which the toner images are transferred.

The pre-heat member 102 includes a reflection member 104, multiple infrared heaters 106 (referred to below as "heaters 106"), heat plates 114, and a wire net 112.

Reflection Member 104

Figure 6:
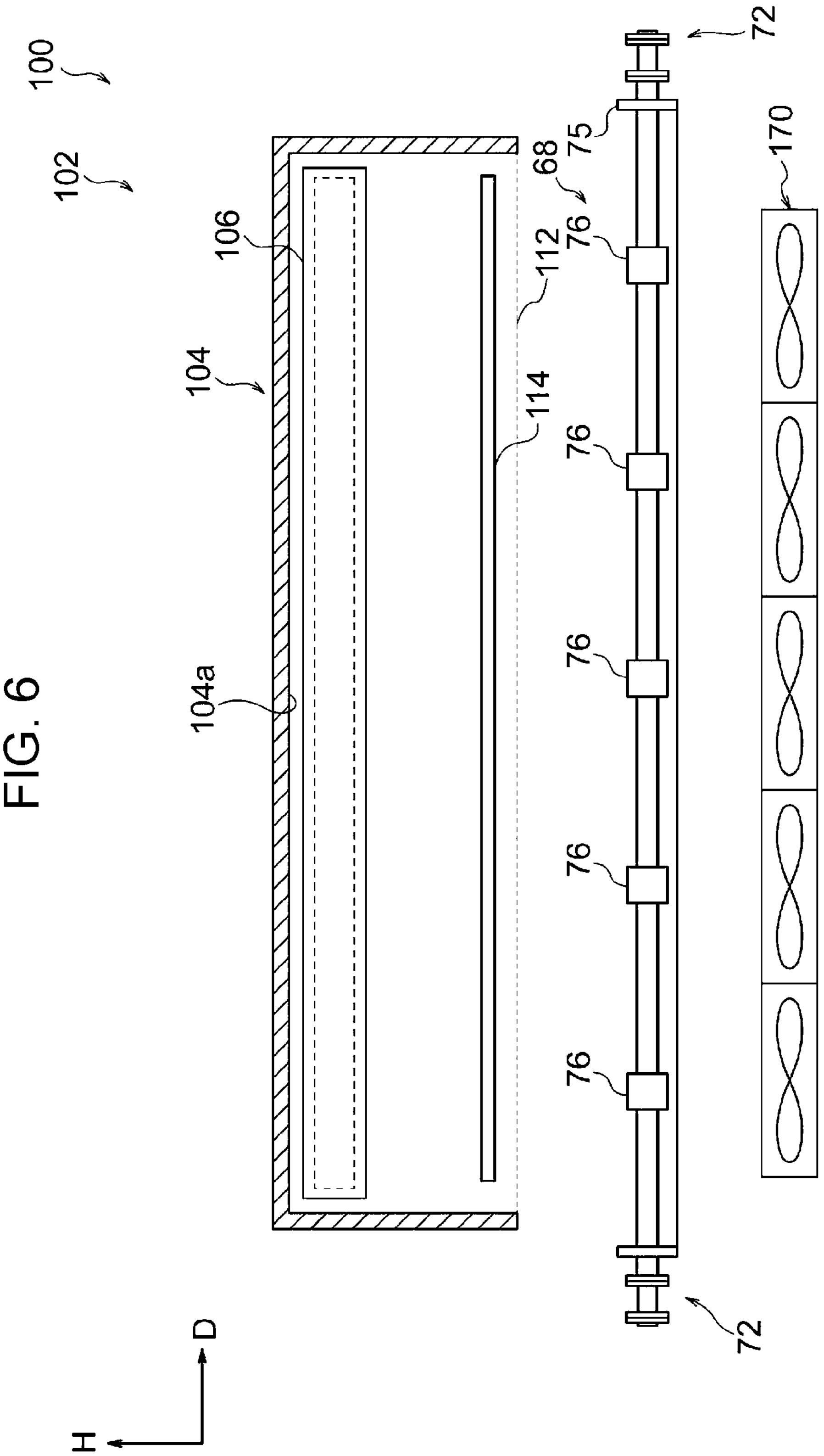
FIG. 6 is a side view of a pre-heat member that is included in the image forming apparatus according to the first exemplary embodiment of the present disclosure.

The reflection member 104 is composed of an aluminum plate and has a shallow box shape that opens toward the sheet P that is transported. As illustrated in FIG. 6, the reflection member 104 contains the heat plates 114 and the heaters 106 in this order from the sheet P that is transported. The reflection member 104 has a reflection surface 104*a* that reflects infrared rays that are heat rays emitted from the heaters 106 toward the heat plates 114.

Heaters 106

The heaters 106 are infrared heaters that have a columnar shape, face the reflection surface 104*a* of the reflection member 104 in the up-down direction of the apparatus, and extend in the depth direction of the apparatus as illustrated in FIG. 6. As illustrated in FIG. 5, the multiple heaters 106 are arranged in the width direction of the apparatus.

Heat Plates 114

As illustrated in FIG. 5, the multiple heat plates 114 are disposed between the chains 72 and the heaters 106 and are arranged in the width direction of the apparatus.

With this structure, the heat plates 114 absorb the infrared rays that are emitted from the heaters 106 and the infrared rays that are reflected by the reflection surface 104*a*. Consequently, the temperature thereof increases, and heat is dissipated. The heat plates 114 that have an increased temperature heat the sheet P that is transported in a contactless manner.

Wire Net 112

The wire net 112 is fixed to an edge of the reflection member 104 by using, for example, a fixation member, not illustrated, and separates an inner portion of the reflection member 104 from a portion outside the reflection member 104 as illustrated in FIG. 5. Consequently, the wire net 112 prevents the sheet P that is transported and the heat plates 114 from coming into contact with each other.

Blower Unit 170

Figure 9:
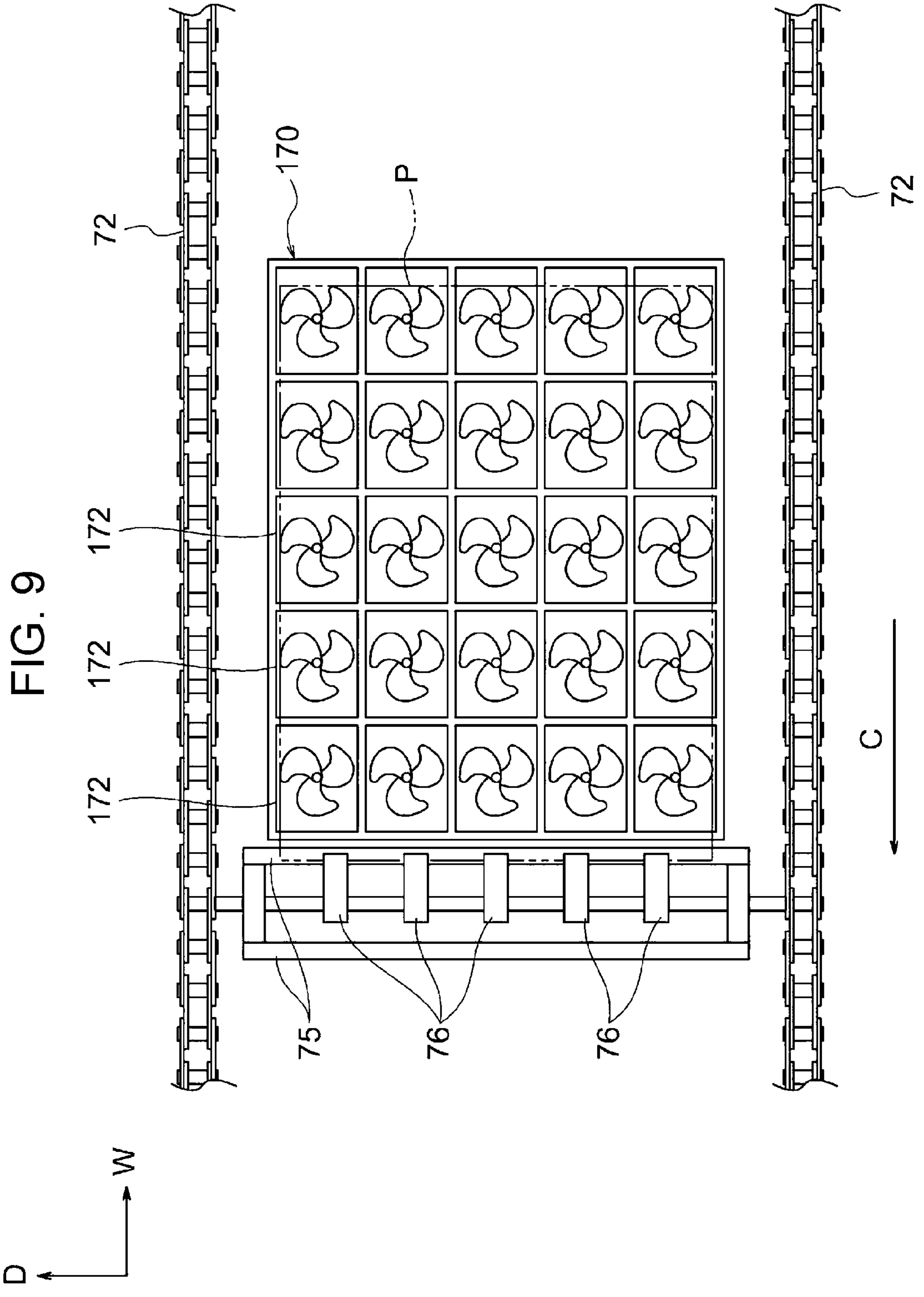
FIG. 9 is a plan view of a blower unit that is included in the image forming apparatus according to the first exemplary embodiment of the present disclosure.

As illustrated in FIG. 5, the blower unit 170 faces the pre-heat member 102 in the up-down direction of the apparatus. The sheet P that is transported passes between the blower unit 170 and the pre-heat member 102. As illustrated in FIG. 9, the blower unit 170 includes multiple fans 172 that are arranged in the width direction of the apparatus and in the depth direction of the apparatus.

With this structure, the multiple fans 172 blow air toward the sheet P that is transported and stabilize the posture of the sheet P that is transported.

Cooling Portion 90

As illustrated in FIG. 1, the cooling portion 90 is disposed downstream of the fixing device 100 and the transport unit 174 in the direction in which the sheet P is transported. The cooling portion 90 includes two cooling rollers 92 that are arranged in the width direction of the apparatus. The two cooling rollers 92 have the same structure. Accordingly, one of the cooling rollers 92 will be described.

Figure 4:
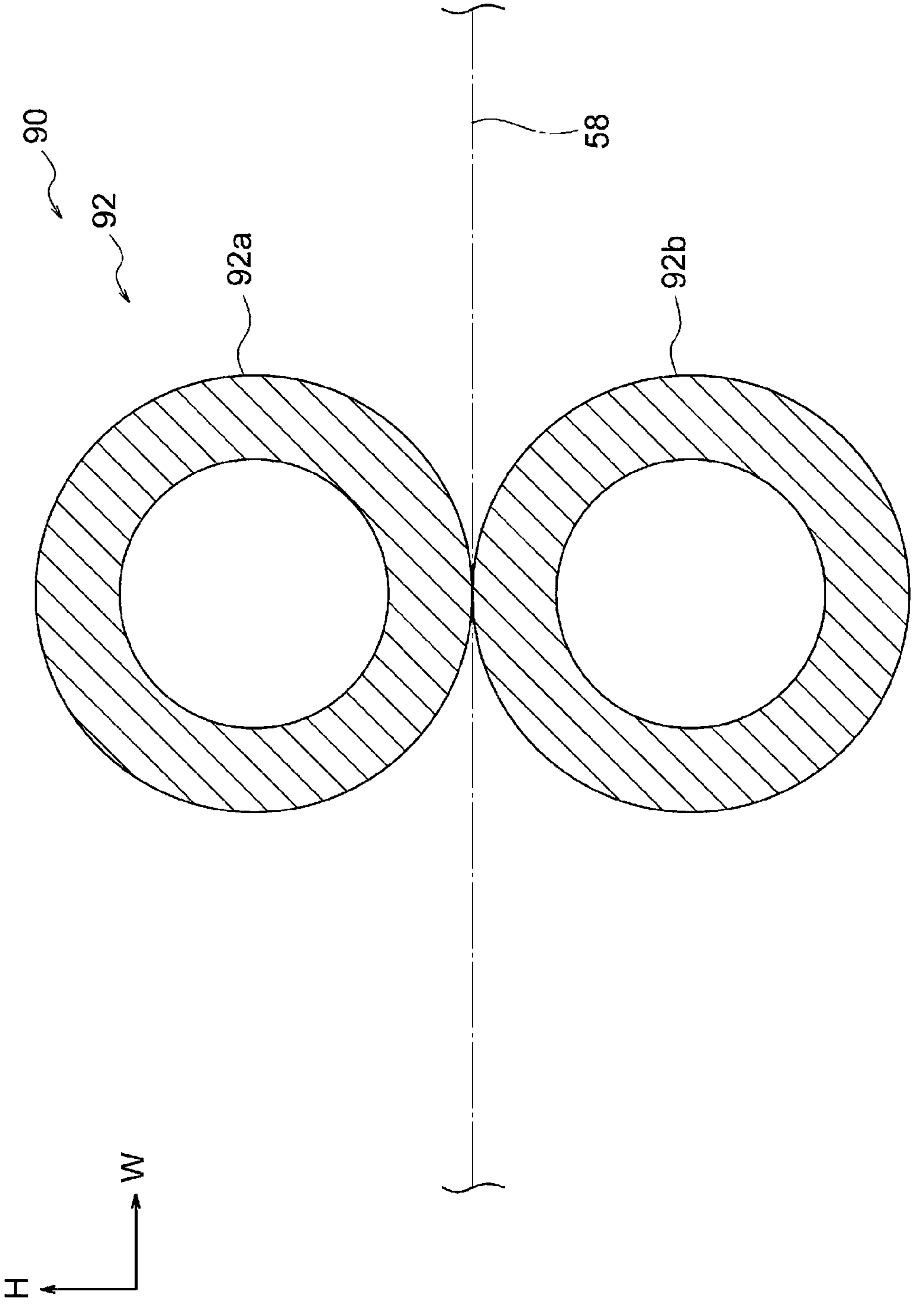
FIG. 4 illustrates a cooling portion that is included in the image forming apparatus according to the first exemplary embodiment of the present disclosure.

As illustrated in FIG. 4, the cooling roller 92 include a cooling roller 92*a* that is disposed above the path 58 for transporting the sheet P and that is cylindrical and a cooling roller 92*b* that is disposed below the path 58 for transporting the sheet P and that is cylindrical.

With this structure, an air-sending mechanism, not illustrated, causes air to flow through an inner portion of the cooling roller 92 that is cylindrical, and the temperature of the surface of the cooling roller 92 decreases. A drive member, not illustrated, transmits rotational force to the cooling roller 92*b*, and the cooling roller 92*b* consequently rotates. The cooling roller 92*a* rotates in conjunction with the cooling roller 92*b*. The cooling rollers 92*a* and 92*b* transport the sheet P with the sheet P interposed therebetween and cool the sheet P.

Actions

The actions of the image forming apparatus 10 will now be described.

The image forming apparatus 10 illustrated in FIG. 1 forms an image in the following manner.

The chargers 22 for the respective colors illustrated in FIG. 2 to which a voltage is applied negatively charge the surfaces of the photoconductor drums 21 for the respective colors uniformly with a predetermined potential. Subsequently, the exposure devices 23 radiate exposure light to the charged surfaces of the photoconductor drums 21 for the respective colors, based on image data that is inputted from the outside and form the electrostatic latent images.

Consequently, the electrostatic latent images depending on the image data are formed on the respective surfaces of the photoconductor drums 21. The developing devices 24 for the respective colors develop the electrostatic latent images as visible toner images. The first transfer rollers 33 transfer the toner images that are formed on the surfaces of the photoconductor drums 21 for the respective colors to the transfer belt 31.

The sheet P that is fed by the feed rollers 62 from one of the container units 50 illustrated in FIG. 1 to the path 58 for transporting and that is given to the chain gripper 66 from the transport rollers 64*a* is fed to the second transfer position NT at which the transfer belt 31 and the facing roller 36 are in contact with each other. Specifically, the grippers 76 (see FIG. 3) grip the leading edge portion of the sheet P, and the sheet P is consequently given to the chain gripper 66 from the transport rollers 64*a*.

At the second transfer position NT, the sheet P is interposed between the transfer belt 31 and the facing roller 36 and is transported, and the toner images on the surface of the transfer belt 31 are consequently transferred to the surface of the sheet P.

The chains 72 that turn transport the sheet P to which the toner images are transferred. The fans 172 illustrated in FIG. 5 operate, the fans 172 blow air to the sheet P from below such that the surfaces of the sheet P face in the up-down direction.

A voltage is applied to the heaters 106 of the pre-heat member 102. The heat plates 114 absorb the infrared rays that are emitted from the heaters 106 to which the voltage is applied and the infrared rays that are reflected by the reflection surface 104*a*. Consequently, the temperature thereof increases, and heat is dissipated. From above, the heat plates 114 that have an increased temperature heat the sheet P that is transported by the chains 72 that turn in a contactless manner. The sheet P is heated, and consequently, the toner for forming the toner images that are transferred to the sheet P is softened.

As for the heat member 120, the heat roller 130 and the pressure roller 140 transport the sheet P that is heated by the pre-heat member 102 with the sheet P interposed therebetween and fix the toner images to the sheet P. The sheet P to which the toner images are fixed is released from the grippers 76, is transported by the transport unit 174 and the transport rollers 64*b* illustrated in FIG. 1, passes through the cooling portion 90, and is discharged onto the discharge portion 52.

Components

The transport unit 174 will now be described.

Figure 10:
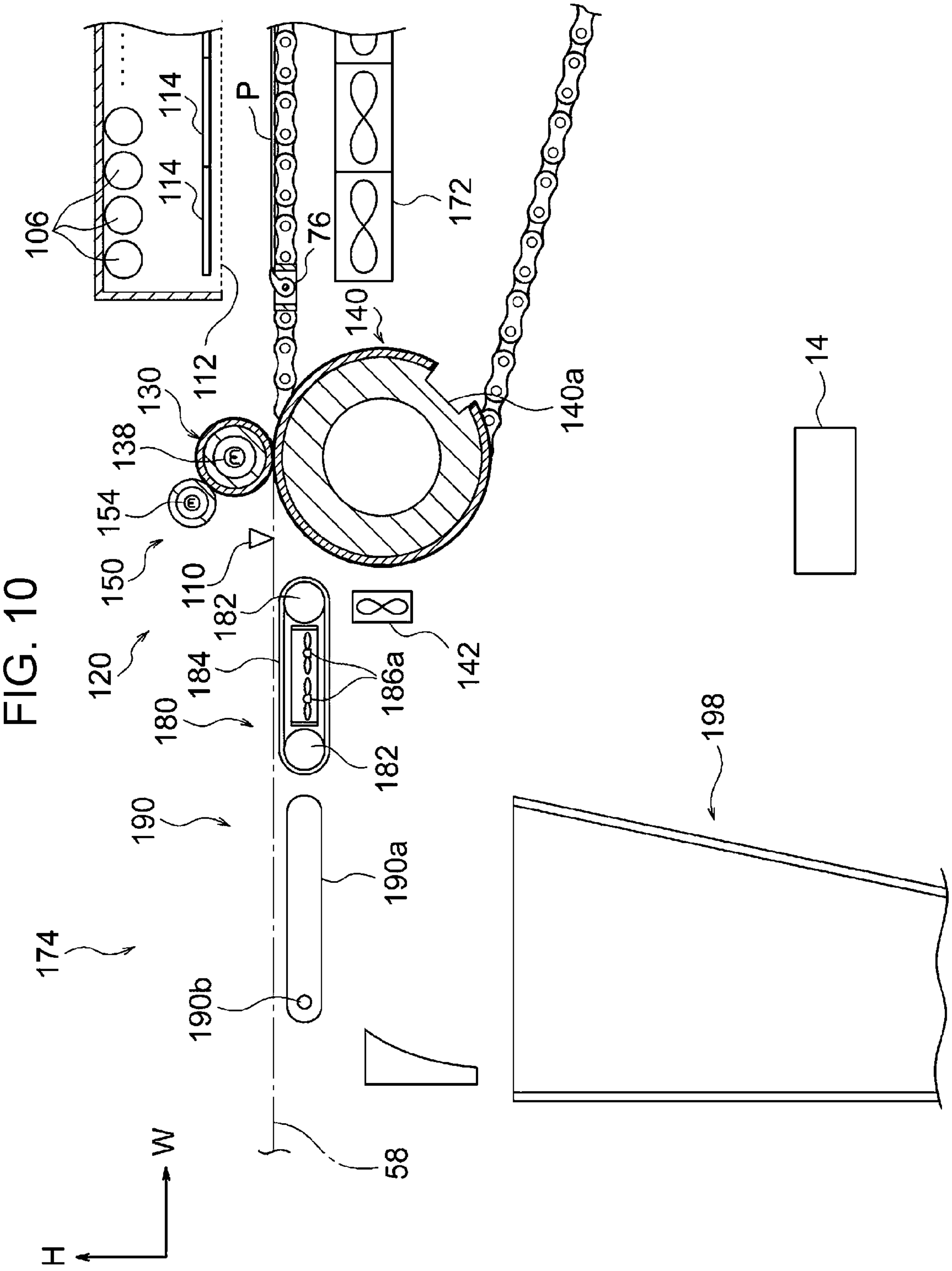
FIG. 10 illustrates a transport unit according to the first exemplary embodiment of the present disclosure.
Figure 11:
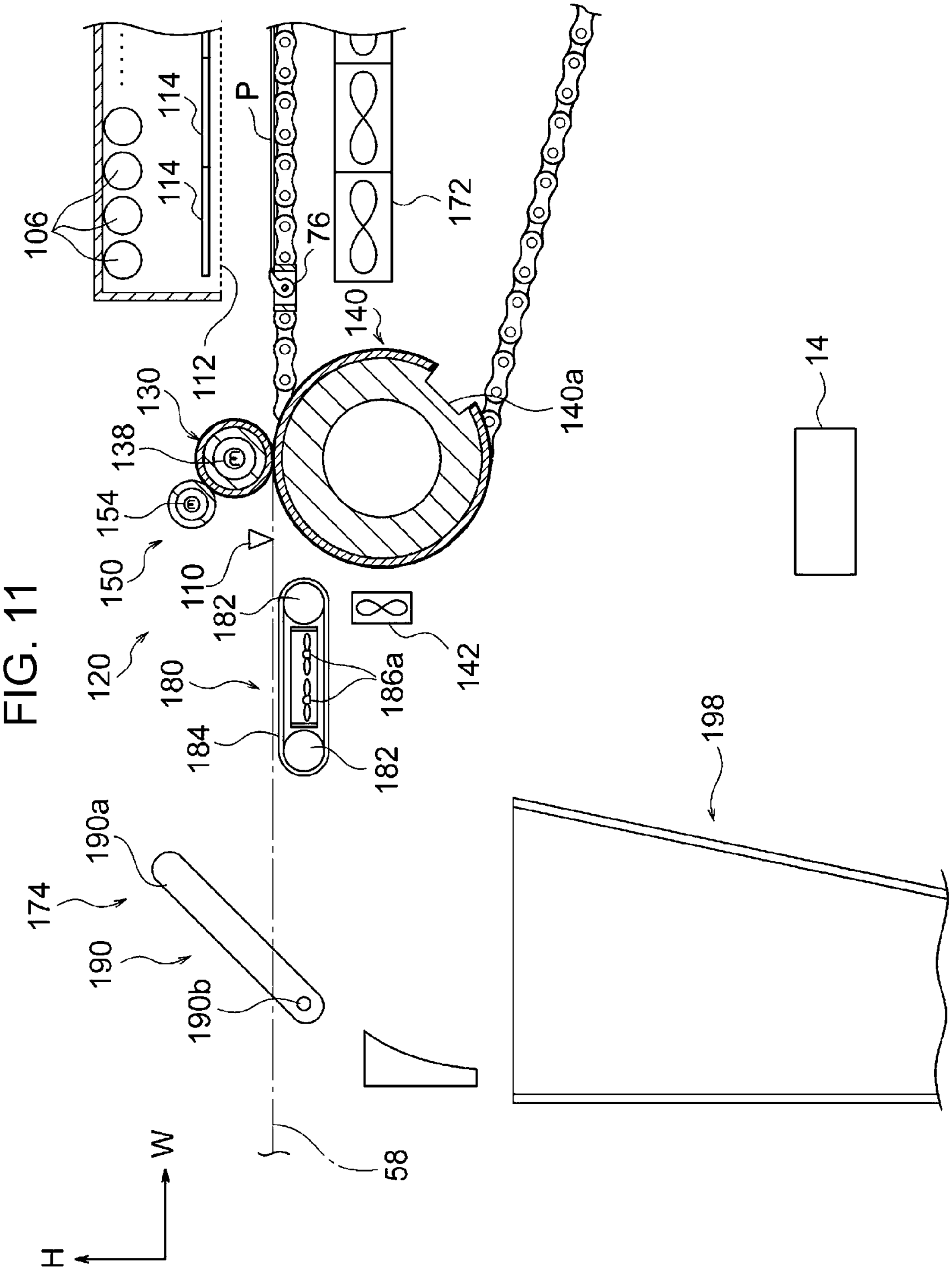
FIG. 11 illustrates the transport unit according to the first exemplary embodiment of the present disclosure.

As illustrated in FIG. 10, the transport unit 174 is disposed downstream of the heat member 120 in the direction in which the sheet P is transported. That is, the transport unit 174 transports the sheet P that is fed from the heat member 120.

The transport unit 174 includes a belt transport device 180, a guide unit 190 that guides the sheet P that is fed by the belt transport device 180 to one of multiple transport directions, and a collection member 198 that receives and collects the sheet P that is guided by the guide unit 190. The belt transport device 180 is an example of a transport device.

Belt Transport Device 180

Figure 12:
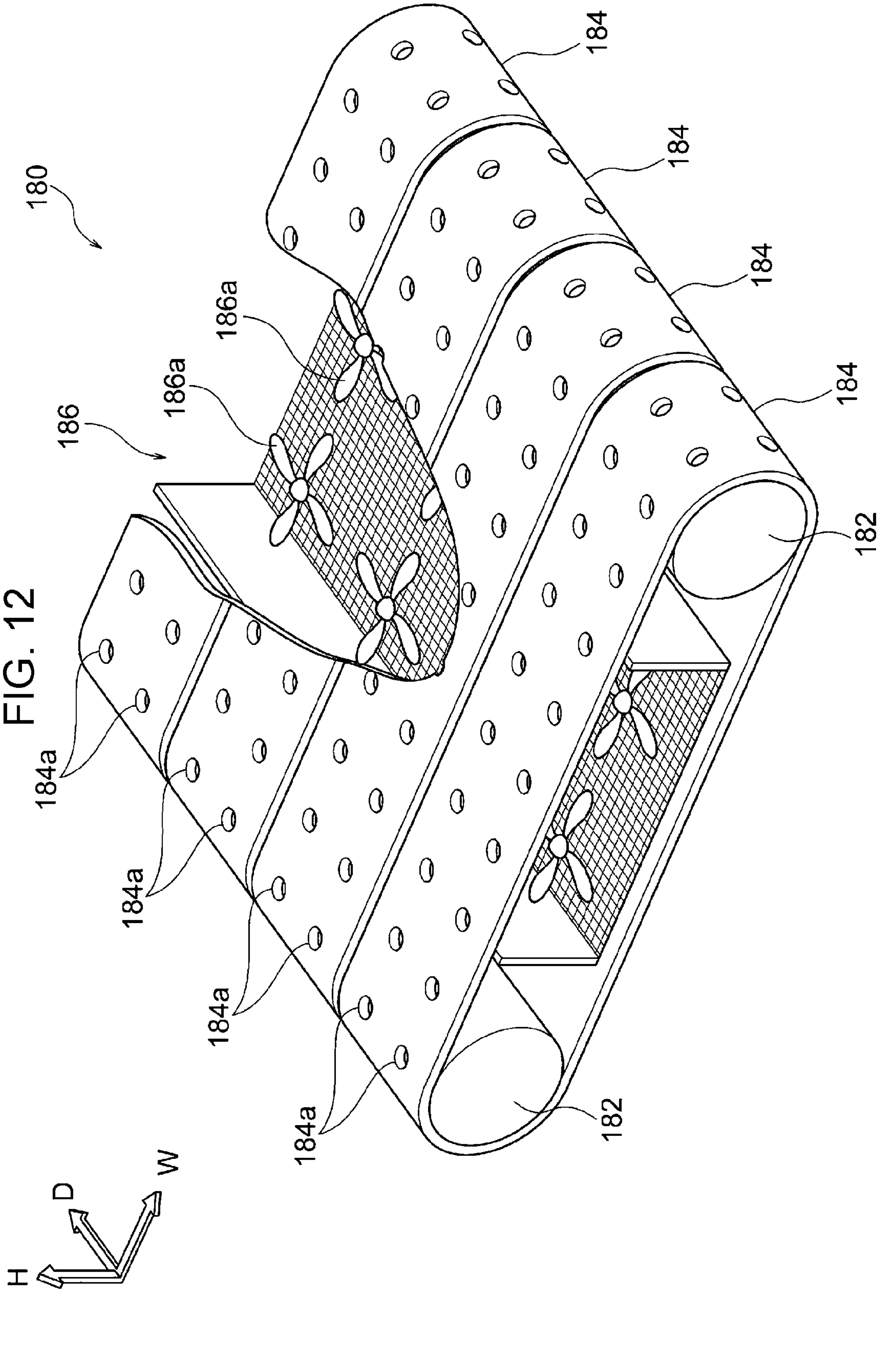
FIG. 12 is a perspective view of a belt transport device that is included in the transport unit according to the first exemplary embodiment of the present disclosure.

As illustrated in FIG. 12, the belt transport device 180 includes two roller members 182 that are separated from each other in the width direction and that have an axial direction that coincides with the depth direction and multiple loop belts 184 that are wound around the two roller members 182, that are arranged in the depth direction, and that have no ends. The belt transport device 180 also includes a fan unit 186 that is surrounded by the loop belts 184. The loop belts 184 are examples of a loop member.

The loop belts 184 have multiple through-holes **184*a* that extend between the front and the back. The fan unit 186 includes multiple fans 186*a* that are arranged in the width direction and in the depth direction. The fans 186*a*** are examples of an attraction member.

With this structure, a drive source, not illustrated, transmits rotational force to one of the roller members 182, and the one of the roller members 182 consequently rotates. The one of the roller members 182 rotates, the loop belts 184 consequently turn, and the other roller member 182 rotates. The fans **186*a* that operate attract the sheet P that is given to the belt transport device 180 to surfaces (upward facing surfaces) of the loop belts 184**.

In this way, the belt transport device 180 transports and feeds the sheet P that is attracted to the surfaces of the loop belts 184 toward a downstream position.

Guide Unit 190 and Collection Member 198

As illustrated in FIG. 10, the guide unit 190 is disposed downstream of the belt transport device 180 in the direction in which the sheet P is transported.

The guide unit 190 includes a body **190*a* that is elongated and a shaft member 190*b* that is disposed at a first end portion of the body 190*a* and that has an axial direction that coincides with the depth direction. Specifically, the shaft member 190*b* is disposed at the first end portion of the body 190*a* away from the belt transport device 180 with the body 190*a*** extending in the width direction.

Consequently, driving force, not illustrated, is transmitted to the body **190*a*, and the body 190*a* rotates about the shaft member 190*b* and moves to a first position (see FIG. 10) at which the body 190*a* extends in the width direction or to a second position (see FIG. 11) at which a second end portion of the body 190*a*** is higher than the first end portion.

As illustrated in FIG. 10, the collection member 198 is disposed below the guide unit 190 and collects the sheet P that is guided by the guide unit 190 although this will be described in detail later.

Controller 14

The controller 14 will now be described. Specifically, components of the controller 14 that control the transport unit 174 will be described.

Figure 13:
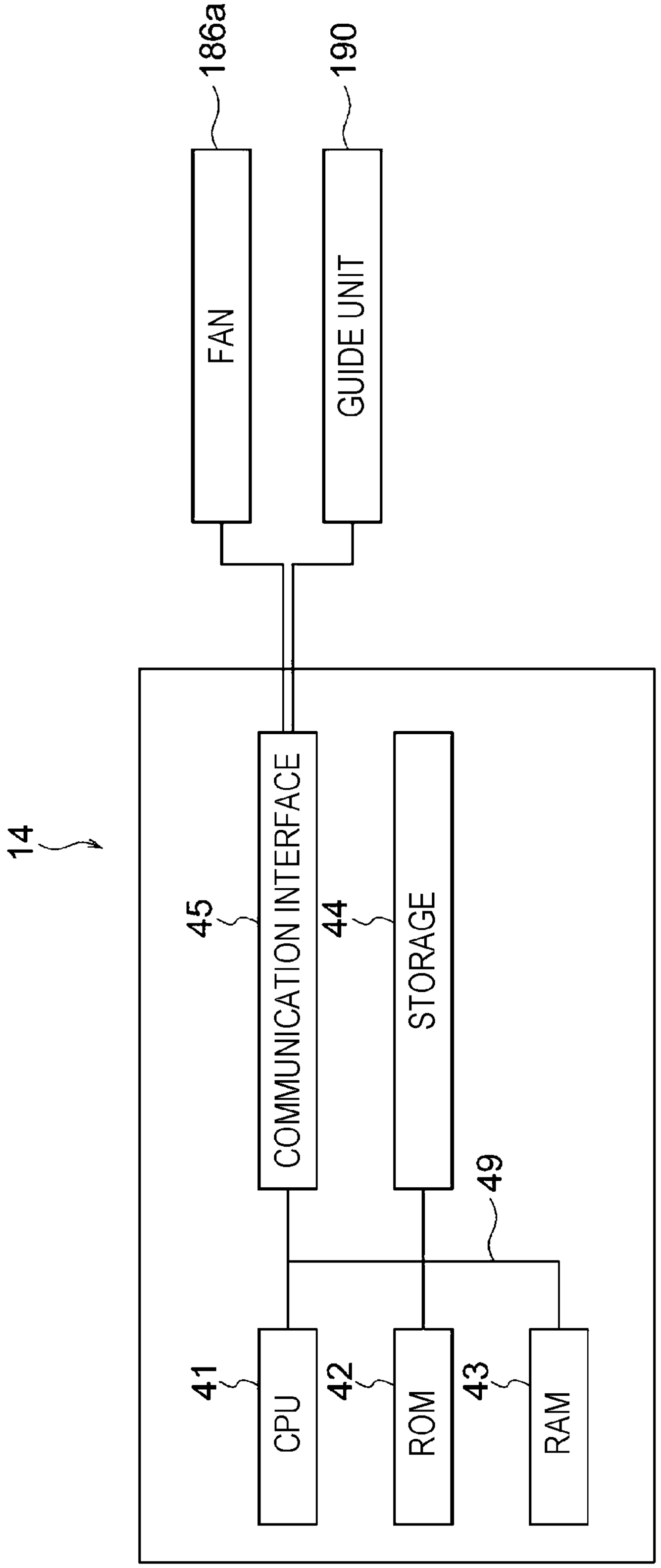
FIG. 13 is a diagram illustrating, for example, the hardware configuration of a controller according to the first exemplary embodiment of the present disclosure.

As illustrated in FIG. 13, the controller 14 includes a central processing unit (CPU) 41, a read only memory (ROM) 42, a random access memory (RAM) 43, a storage 44, and a communication interface (I/F) 45. These components are connected to each other by using a bus 49 so as to be capable of communicating with each other.

The CPU 41 is a central processing unit that runs various programs and controls components. That is, the CPU 41 reads a program from the ROM 42 or the storage 44 and runs the program with the RAM 43 used as a work area. The CPU 41 controls the components and performs various kinds of arithmetic processing in accordance with the program that is stored in the ROM 42 or the storage 44.

The ROM 42 stores the various programs and various kinds of data. The RAM 43 serves as the work area that temporarily stores a program or data. The storage 44 includes a hard disk drive (HDD) or a solid state drive (SSD) and stores the various programs including an operating system and the various kinds of data. The communication interface 45 is an interface for the controller 14 to communicate with, for example, the fans **186*a* and the guide unit 190**.

Actions for Components

Figure 14:
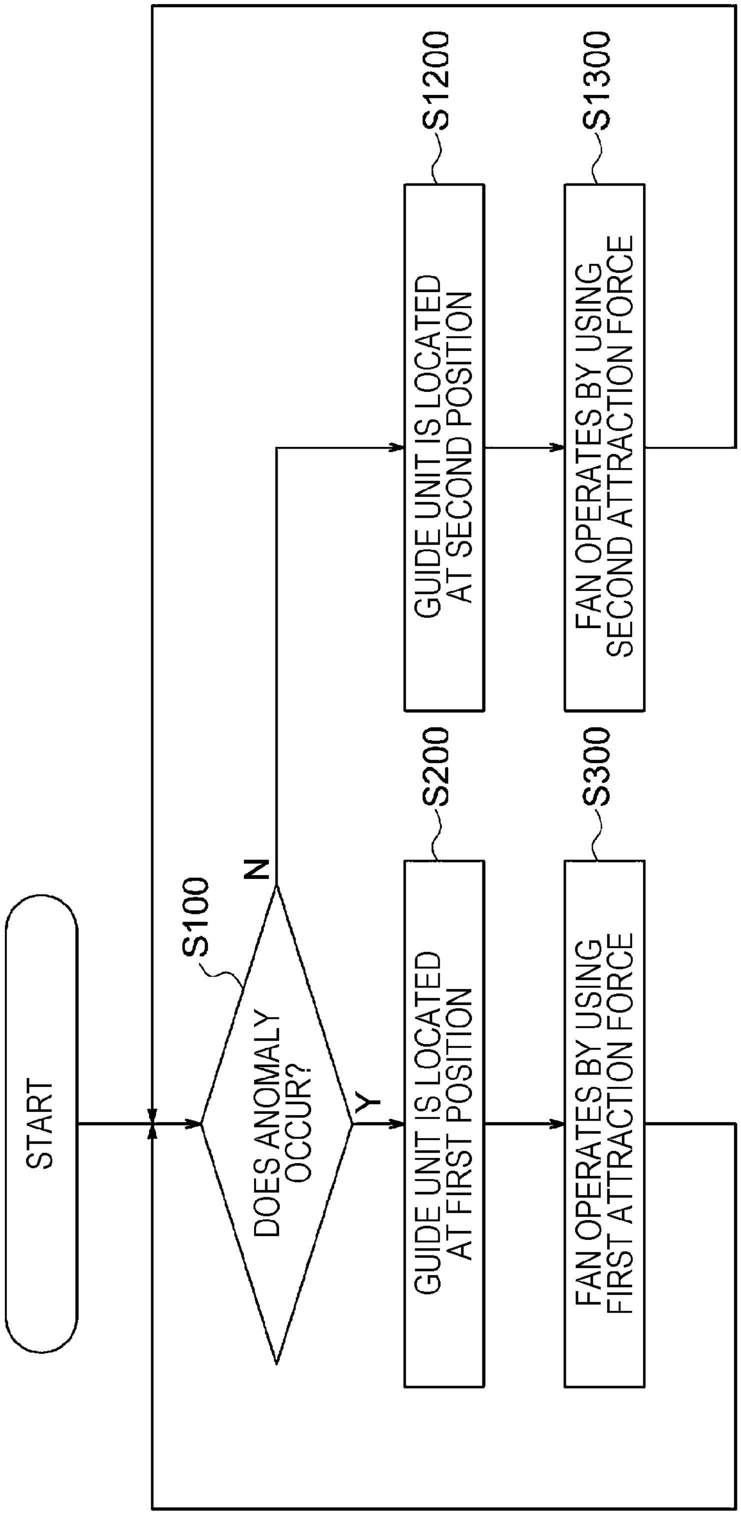
FIG. 14 illustrates a control flow with the controller according to the first exemplary embodiment of the present disclosure.

The actions of the transport unit 174 will now be described with reference to a flowchart in FIG. 14.

At a step S100, the controller 14 detects whether the image formation operation of the image forming apparatus 10 is abnormal. If the image formation operation is not abnormal, the guide unit 190 is caused to be located at the first position at a step S200 (see FIG. 10).

At a step S300, the controller 14 causes the fans **186*a* to operate such that the sheet P is attracted to the surfaces of the loop belts 184 by using first attraction force, causes the roller members 182 to rotate, and causes the loop belts 184** to turn.

Figure 15:
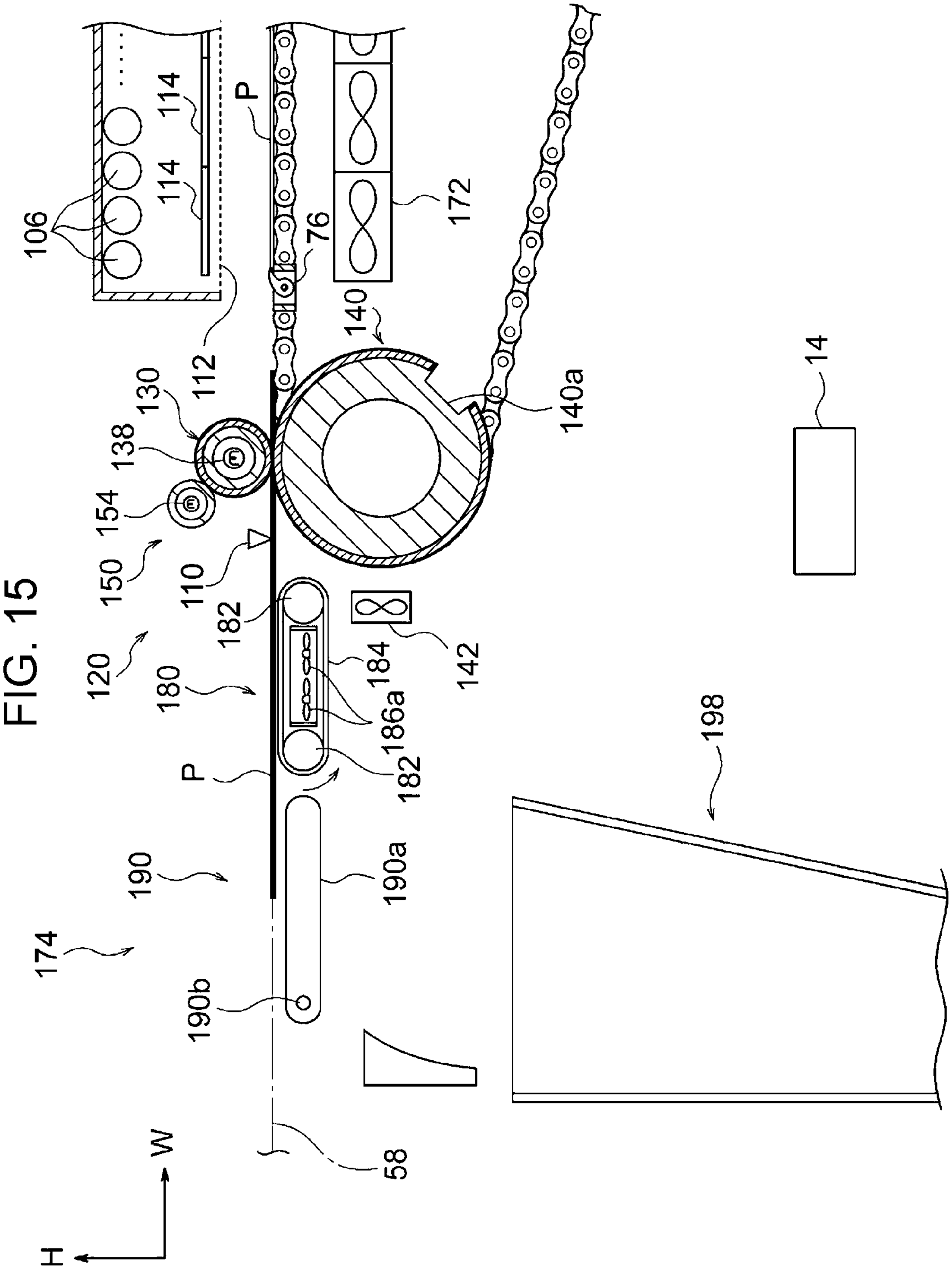
FIG. 15 illustrates the transport unit according to the first exemplary embodiment of the present disclosure that transports a sheet.

In this state, as illustrated in FIG. 15, the belt transport device 180 receives the sheet P that is fed from the heat member 120 and transports the sheet P to the guide unit 190. The sheet P that is transported moves along an upper surface of the guide unit 190. The guide unit 190 does not change a feed direction in which the sheet P is fed from the belt transport device 180 and guides the sheet P.

The sheet P that is guided by the guide unit 190 is transported by the transport rollers **64*b* illustrated in FIG. 1, subsequently passes through the cooling portion 90, and is discharged onto the discharge portion 52**.

After transporting the sheet P ends, the controller 14 detects whether the image formation operation of the image forming apparatus 10 is abnormal again at the step S100. When a sensor, not illustrated, detects that the image formation operation is an abnormal operation such as a transfer failure or a fixing failure, it is detected that the image formation operation is abnormal, and the controller 14 causes the guide unit 190 to move to the second position at a step S1200 (see FIG. 11).

At a step S1300, the controller 14 causes the fans **186*a* to operate such that the sheet P is attracted to the surfaces of the loop belts 184 by using second attraction force, causes the roller members 182 to rotate, and causes the loop belts 184** to turn.

Figure 16:
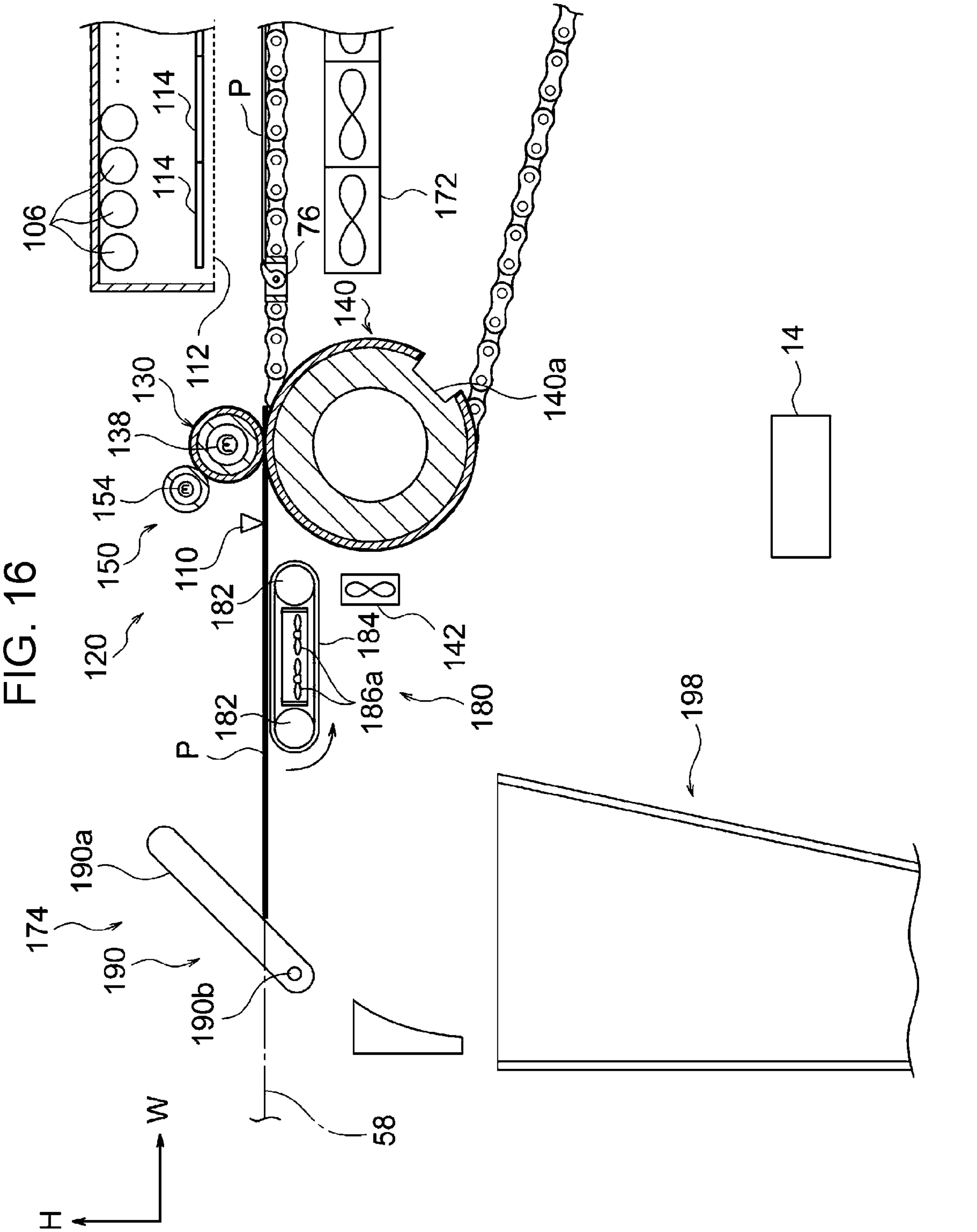
FIG. 16 illustrates the transport unit according to the first exemplary embodiment of the present disclosure that transports the sheet.

In this state, as illustrated in FIG. 16, the belt transport device 180 receives the sheet P that is fed from the heat member 120 and transports the sheet P to the guide unit 190. The sheet P that is transported comes into contact with an inclined lower surface of the guide unit 190. The guide unit 190 changes the feed direction in which the sheet P is fed from the belt transport device 180. Specifically, the guide unit 190 guides the sheet P such that the sheet P is transported downward with respect to the feed direction (a horizontal direction) from the belt transport device 180.

Figure 17:
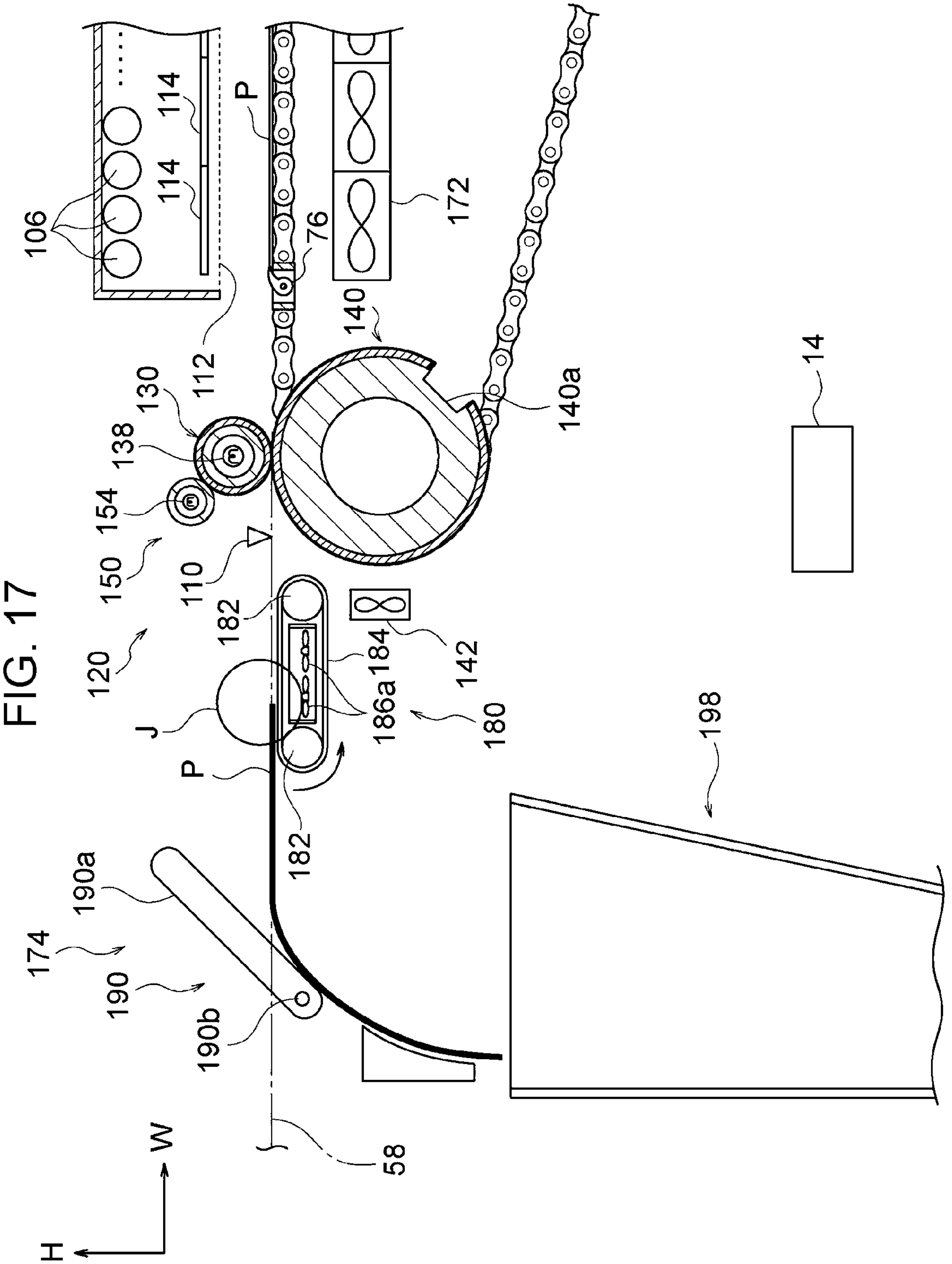
FIG. 17 illustrates the transport unit according to the first exemplary embodiment of the present disclosure that transports the sheet.

As illustrated in FIG. 17, the sheet P that is fed from the belt transport device 180 is transported with the sheet P curved such that an edge thereof facing downward. The sheet P curves, and consequently, force is applied to a trailing edge portion (a portion J in the figure) of the sheet P in a direction away from the loop belts 184. The trailing edge portion of the sheet P is separated from the loop belts 184, and consequently, force for transporting is not transmitted to the sheet P.

However, the controller 14 causes the fans 186*a* to operate such that the sheet P is attracted to the surfaces of the loop belts 184 by using the second attraction force stronger than the first attraction force as described above.

Figure 18:
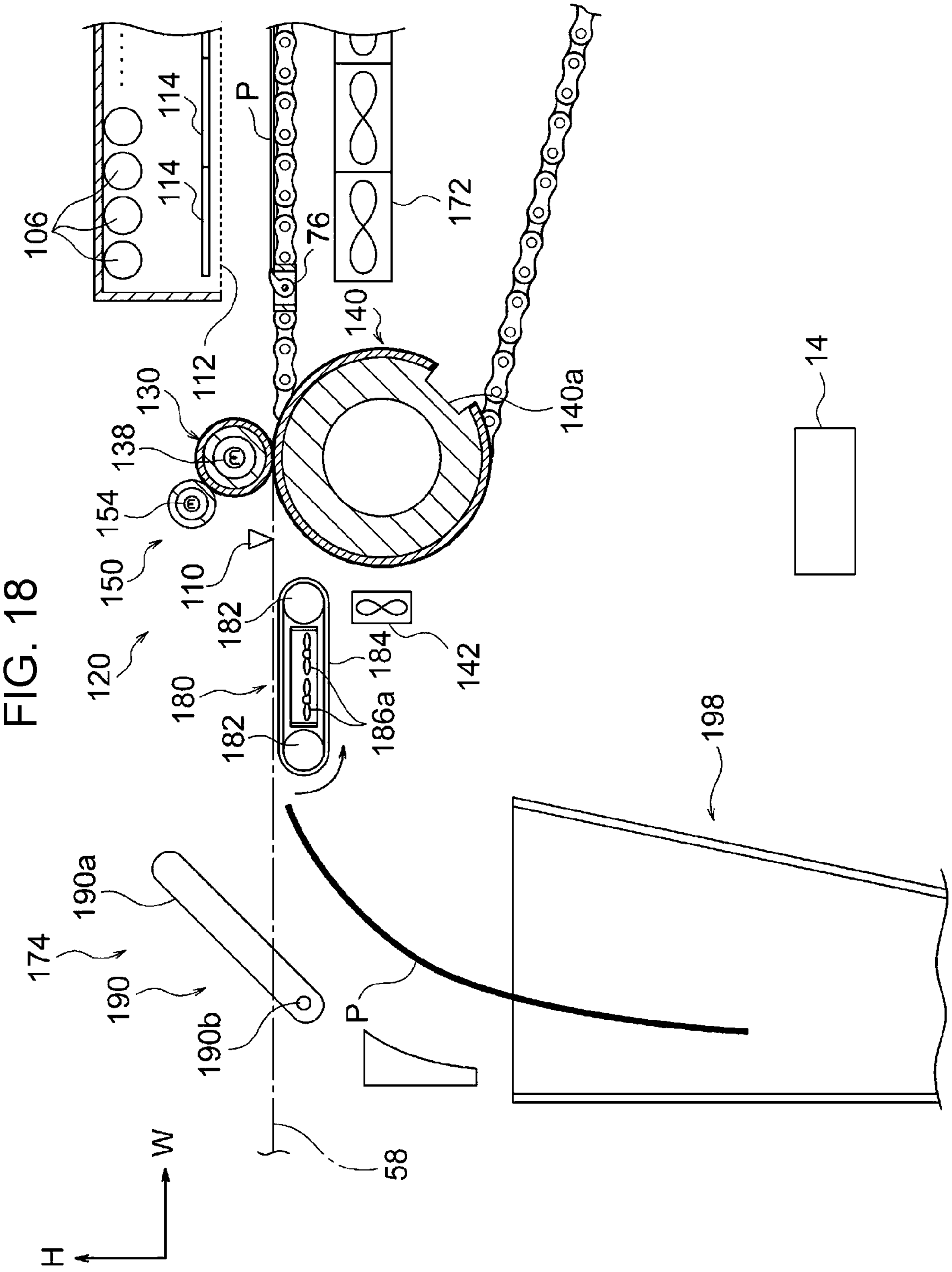
FIG. 18 illustrates the transport unit according to the first exemplary embodiment of the present disclosure that transports the sheet.

In this way, the trailing edge portion of the sheet P may be inhibited from being separated from the loop belts 184, and the belt transport device 180 transports the sheet P toward the collection member 198 as illustrated in FIG. 18. The collection member 198 collects the sheet P that has an image failure such as a transfer failure or a fixing failure.

After transporting the sheet P ends, the controller 14 detects whether the image formation operation of the image forming apparatus 10 is abnormal again at the step S100. A print job ends, and the flow described above ends.

Summary

As for the transport unit 174, the controller 14 controls the fans 186*a*, based on the transport direction of the sheet P that is changed by the guide unit 190 such that the attraction force is changed as described above.

As for the transport unit 174, the controller 14 causes the fans 186*a* to increase the attraction force when the guide unit 190 guides the sheet P downward with respect to the feed direction from the belt transport device 180. Specifically, the controller 14 causes the fans 186*a* to increase the attraction force to force stronger than that in the case where the guide unit 190 guides the sheet P such that the sheet P is transported in the feed direction from the belt transport device 180. In this way, when the sheet P is guided downward, the trailing edge portion of the sheet P may be inhibited from being separated from the loop belts 184, unlike the case where the fans decrease the attraction force.

As for the transport unit 174, when the image formation operation of the image forming apparatus 10 is not abnormal, the guide unit 190 does not change the feed direction in which the sheet P is fed from the belt transport device 180 and guides the sheet P. In this way, resistance on the sheet P that is transported may be reduced, unlike the case where the transport direction is changed with the sheet P curved.

Second Exemplary Embodiment

A transport unit and an image forming apparatus according to a second exemplary embodiment of the present disclosure will be described by way of example with reference to FIG. 19.

Figure 19:
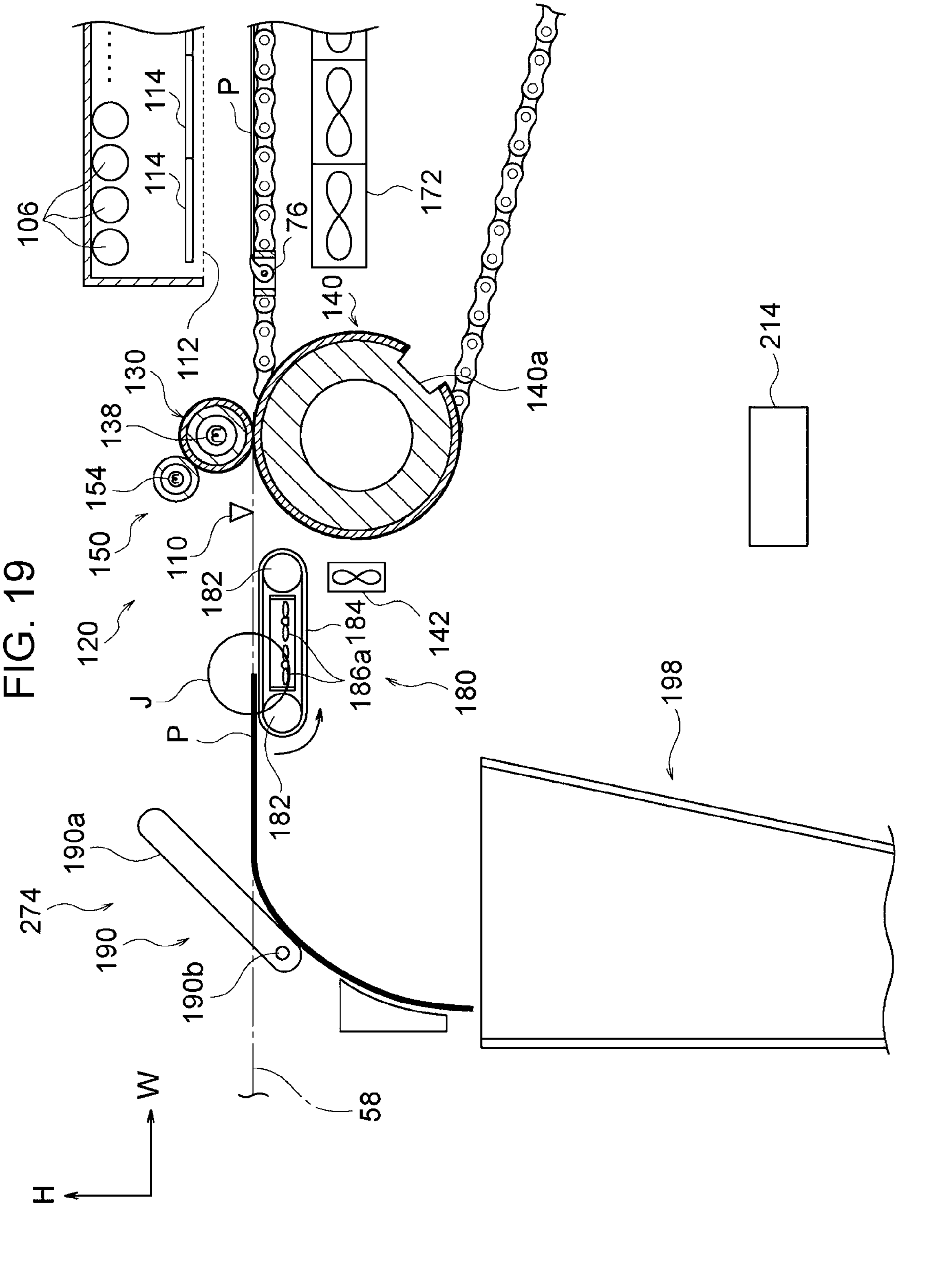
FIG. 19 illustrates a transport unit according to a second exemplary embodiment of the present disclosure that transports a sheet.

As illustrated in FIG. 19, a controller 214 of a transport unit 274 according to the second exemplary embodiment causes the fans 186*a* to operate such that the sheet P is attracted to the surfaces of the loop belts 184 by using the second attraction force stronger than the first attraction force when the guide unit 190 is located at the second position.

The second attraction force is determined depending on the basis weight of the sheet P that is transported. Specifically, in the case where the basis weight of the sheet P is heavy, the controller 214 exerts control such that the degree of change in the attraction force is higher than that in the case where the basis weight of the sheet P is light. That is, the second attraction force is determined depending on the rigidity of the sheet P that is transported.

For this reason, the controller 214 acquires the basis weight of the sheet P that is inputted from an operation screen, not illustrated, by a user. In the case where the basis weight of the sheet P is heavy, the controller 214 stepwise increases the attraction force, unlike the case where the basis weight of the sheet P is light. In other words, in the case where the basis weight of the sheet P is light, the controller 214 stepwise decreases the attraction force, unlike the case where the basis weight of the sheet P is heavy.

The transport unit 274 thus changes the attraction force, based on the basis weight.

As for the transport unit 274, the controller 214 stepwise changes the attraction force. In this way, the attraction force may be adjusted to appropriate attraction force, unlike the case where the attraction force is changed once.

The specific exemplary embodiments of the present disclosure are described in detail. The present disclosure, however, is not limited to the exemplary embodiments, and it is obvious for a person skilled in the art that various other exemplary embodiments may be in the range of the present disclosure. For example, the controllers 14 and 214 cause the guide unit 190 to operate, but the user, for example, may move the guide unit, although this is not particularly described according to the exemplary embodiments described above.

Timing with which the attraction force is increased is not particularly described according to the exemplary embodiments described above. The degree of blowing may be increased at least when the trailing edge portion of the sheet P is in contact with the surfaces of the loop belts 184.

According to the exemplary embodiments described above, the controllers 14 and 214 of the image forming apparatus 10 double as controllers for the transport units 174 and 274. However, an exclusive controller may be provided for the transport units.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A transport unit includes a transport device including a loop member that turns and that has no ends, the transport device transporting a recording medium with the recording medium attracted to a surface of the loop member, a guide unit that changes a transport direction of the recording medium fed from the transport device and that guides the recording medium in one of multiple transport directions, and a controller that controls the transport device, based on the transport direction that is changed by the guide unit such that attraction force of the transport device is changed.

(((2)))

As for the transport unit described in (((1))), the controller exerts control such that, when the guide unit guides the recording medium such that the recording medium is transported downward with respect to a feed direction in which the recording medium is fed from the transport device, the attraction force is stronger than that in a case where the guide unit guides the recording medium in another direction.

(((3)))

As for the transport unit described in (((2))), the guide unit guides the recording medium in the other direction such that the feed direction in which the recording medium is fed from the transport device is not changed.

(((4)))

As for the transport unit described in any one of (((1))) to (((3))), the controller exerts control such that, in a case where a basis weight of the recording medium is heavy, a degree of change in the attraction force is higher than that in a case where the basis weight of the recording medium is light.

(((5)))

As for the transport unit described in (((4))), the controller exerts control such that the attraction force is stepwise changed based on the basis weight of the recording medium.

(((6)))

An image forming apparatus includes a toner image forming unit that forms a toner image on a recording medium, and the transport unit described in any one of (((1))) to (((5))) that transports the recording medium on which the toner image is formed.

What is claimed is:

1. A transport unit comprising:

a transport device including a loop member that turns and that has no ends, the transport device transporting a recording medium with the recording medium attracted to a surface of the loop member;

a guide unit that changes a transport direction of the recording medium fed from the transport device and that guides the recording medium in one of multiple transport directions; and a controller that controls the transport device, based on the transport direction that is changed by the guide unit such that attraction force of the transport device is changed.

2. The transport unit according to claim 1, wherein the controller exerts control such that, when the guide unit guides the recording medium such that the recording medium is transported downward with respect to a feed direction in which the recording medium is fed from the transport device, the attraction force is stronger than that in a case where the guide unit guides the recording medium in another direction.

3. The transport unit according to claim 2, wherein the guide unit guides the recording medium in the other direction such that the feed direction in which the recording medium is fed from the transport device is not changed.

4. The transport unit according to claim 1, wherein the controller exerts control such that, in a case where a basis weight of the recording medium is heavy, a degree of change in the attraction force is higher than that in a case where the basis weight of the recording medium is light.

5. The transport unit according to claim 4, wherein the controller exerts control such that the attraction force is stepwise changed based on the basis weight of the recording medium.

6. An image forming apparatus comprising:

a toner image forming unit that forms a toner image on a recording medium; and the transport unit according to claim 1 that transports the recording medium on which the toner image is formed.

7. An image forming apparatus comprising:

a toner image forming unit that forms a toner image on a recording medium; and the transport unit according to claim 2 that transports the recording medium on which the toner image is formed.

8. An image forming apparatus comprising:

a toner image forming unit that forms a toner image on a recording medium; and the transport unit according to claim 3 that transports the recording medium on which the toner image is formed.

9. An image forming apparatus comprising:

a toner image forming unit that forms a toner image on a recording medium; and the transport unit according to claim 4 that transports the recording medium on which the toner image is formed.

10. An image forming apparatus comprising:

a toner image forming unit that forms a toner image on a recording medium; and the transport unit according to claim 5 that transports the recording medium on which the toner image is formed.

11. A transport unit comprising:

transporting means for transporting a recording medium with the recording medium attracted to a surface of a loop member that turns and that has no ends;

guiding means for changing a transport direction of the recording medium fed from the transporting means and for guiding the recording medium in one of multiple transport directions; and means for controlling the transporting means, based on the transport direction that is changed by the guiding means such that attraction force of the transporting means is changed.

* * * * *